United States Patent [19]

Douglas

[11] Patent Number: 4,529,298
[45] Date of Patent: Jul. 16, 1985

[54] STEP AND REPEAT PHOTO MASK APPARATUS

[76] Inventor: Robert E. Douglas, 840 Meridian Way, #78, San Jose, Calif. 95126

[21] Appl. No.: 549,510

[22] Filed: Nov. 7, 1983

[51] Int. Cl.³ .............................................. G03B 27/58
[52] U.S. Cl. ...................................... 355/53; 355/54; 355/77; 355/72
[58] Field of Search ................... 355/77, 75, 53, 72, 355/54, 86, 95, 125

[56] References Cited

U.S. PATENT DOCUMENTS

| | | | |
|---|---|---|---|
| 2,601,804 | 7/1952 | Nineberg | 355/53 |
| 3,436,149 | 4/1969 | Wicker | 355/75 |
| 3,639,056 | 2/1972 | Gerson | 355/75 X |

Primary Examiner—L. T. Hix
Assistant Examiner—Brian W. Brown
Attorney, Agent, or Firm—Fliesler, Dubb, Meyer & Lovejoy

[57] ABSTRACT

In accordance with the present invention a photomasking kit (20) is provided which is useful for exposing photoready copy (12) so as to provide a plurality of like images of the copy (12) on a single master or negative (14). A plate (22) of a non-reproducing color has a plurality of posts (54) or openings (56) along its left (30) and right (32) margins. The photoready copy (12) is mounted to a mounting member (34) which has appropriate openings (56) or posts (54) for engagement with the posts (54) or openings (56) of the plate (22). The mounting member (34) is attached in a desired specific location to the plate (22). Areas of the plate (22) which it is not desired to expose onto the master or negative (14) are shielded. After exposure in this arrangement the mounting member (34) is moved to other positions on the plate (22) while other areas of the plate (22) are shielded and additional exposures of the master or negative (14) are carried out. As a result, a plurality of like images of the photoready copy (12) are produced on the master or negative (14). Alignment is very quick due to the use of the posts (54) and openings (56).

14 Claims, 5 Drawing Figures

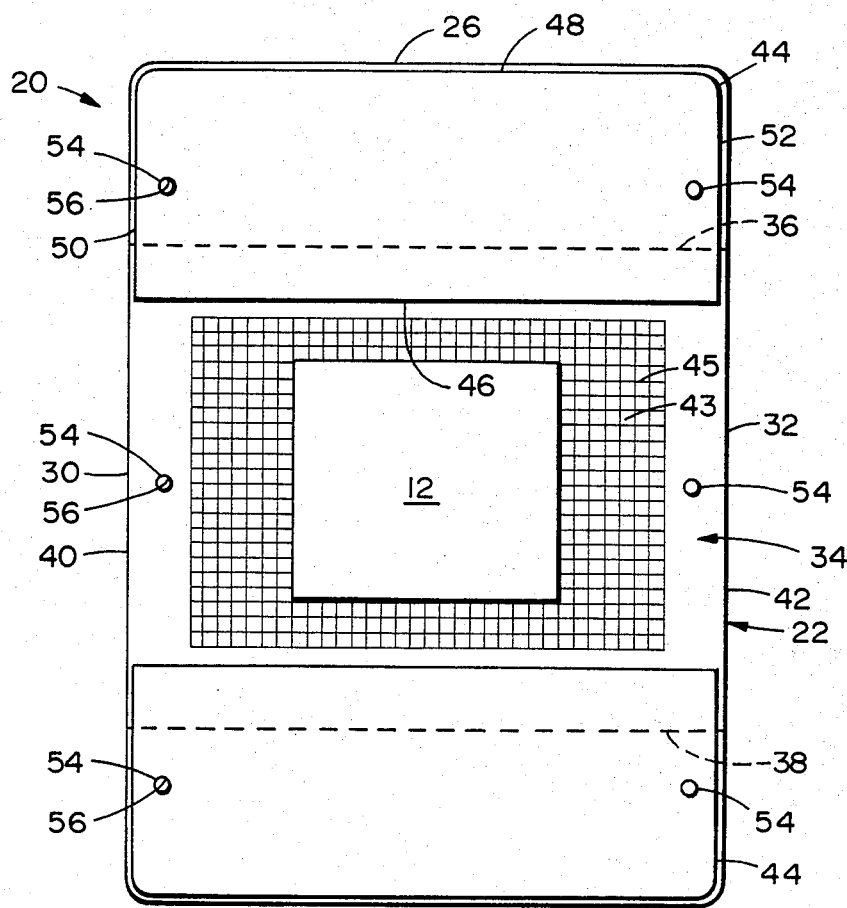
FIG. 1
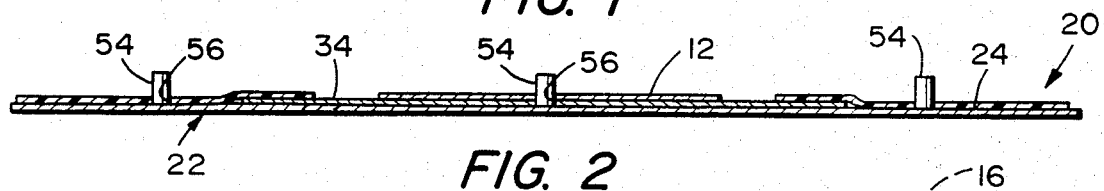
FIG. 2
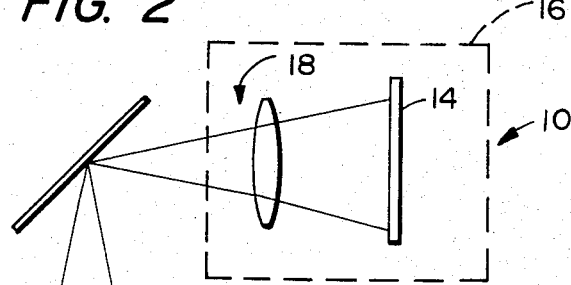
FIG. 3
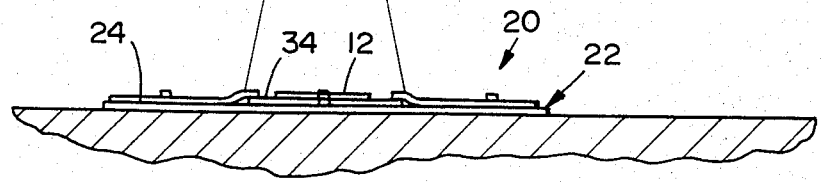

STEP AND REPEAT PHOTO MASK APPARATUS

DESCRIPTION

1. Technical Field

This invention relates to a step and repeat photomasking apparatus useful for exposing a positive work which is to be reproduced into a plurality of copies in such a manner as to provide a plurality of like images of the work on a single photo direct master or on a single negative. The master is then used as a printing plate, or the negative is used to produce a printing plate, from which multiple copies can be printed.

2. Background Art

If a positive work of the nature of photoready copy is to be reproduced in multiple units, as for example when several hundred copies of a business card are to be printed, it is advantageous to provide a plurality of like images of photoready copy on a single master or negative. The master is used as a printing plate, or the negative is used to produce a printing plate, having multiple copies of the photoready copy reproduced thereon. Thereafter, sheets of paper are produced, each having multiple reproductions of the work, and the resulting printed sheets are cut into the business cards. In this manner, multiple copies of a business card are provided for each printing impression.

Presently, multiple image printing as described above requires a good deal of set-up time since the printer must either prepare a plurality of like pieces of photoready copy (e.g., business cards) and position these carefully on a single carrier which is then used in a single exposure to provide multiple images on the master or negative, or use a single piece of photoready copy and carefully align it, by hand, and usually using some type of tape to hold it down, in each position from which an image is desired while masking all other areas in focus upon the master or negative with appropriate materials. This requires an equal number of masking steps and exposure steps to the number of images to be produced on the master or negative. Since each step requires separate and careful alignment, the overall time required for carrying out the entire process can be quite great. Also, a number of masks each having different windows for the copy may be needed depending upon the geometry involved.

It would be highly desirable if one could have the advantage of utilizing only a single piece of photoready copy to make multiple like images and could make the multiple images in a relatively short period of time without the necessity for a number of careful alignment steps for the photoready copy and for the masks. It would also be desirable if it was not necessary to have a relatively large number of masks each having appropriate windows and the like in which the photoready copy had to be aligned for reproduction as an image on the master or negative.

The present invention is directed to overcoming one or more of the problems as set forth above.

DISCLOSURE OF THE INVENTION

In accordance with one aspect of the present invention a photomasking kit is set forth which is useful for exposing a positive work which is to be reproduced into a plurality of copies so as to provide a plurality of like images of the work on a single photosensitive member, i.e., master or negative. The kit comprises a substantially flat generally rectangular plate having a normally upfacing surface, upper, lower, left and right margins, the upfacing surface being of a non-reproducing color which appears to be white upon printing of a positive reproduction onto white paper from the master or negative. A substantially flat and generally rectangular positive work mounting member is provided having a top, a bottom, a left side and a right side. The positive work mounting member is of a non-reproducing color which appears to be white upon printing of a positive reproduction onto white paper from the master or negative. At least one substantially flat generally rectangular masking member is provided having a mask bottom, a mask top, a mask left side and a mask right side and being of a color such that any light reflected therefrom onto the master or negative is of a wavelength such that the master or negative is not exposed thereby. Either (1) the plate or (2) both the mounting member and the masking member has a plurality of posts extending toward a respective other thereof. A respective other of (1) the plate or (2) both the mounting member and the masking member has a plurality of openings adapted for engagement with the posts. The posts and the openings are located adjacent, generally parallel to, and inboard of respective of the left margin, the right margin, the left side, the right side, the mask left side and the mask right side.

In accordance with another aspect of the present invention, a photomasking kit is set forth which includes a substantially flat generally rectangular plate having a normally upfacing surface having a central portion of a color such that any light reflected therefrom onto the master or negative is of a wavelength such that the master or negative is not exposed thereby. The rectangular plate includes upper, lower, left and right margins or a non-reproducing color which appears to be white upon printing of a positive reproduction onto white paper from the master or negative. A substantially flat generally rectangular positive work mounting member is provided having a top, a bottom, a left side and a right side. The positive work mounting member is of a non-reproducing color which appears to be white upon printing of a positive reproduction onto white paper from the master or negative. A respective one of the plate and the mounting member has a plurality of posts extending towards a respective other thereof and the respective other of the plate and the mounting member has a plurality of openings adapted for engagement with the posts. The posts and the openings are located adjacent, generally parallel to, and inboard of respective of the left margin, the right margin, the left side of the work mounting member and the right side of the work mounting member. The posts are of a non-reproducing color which appears to be white upon printing of a positive reproduction onto white paper from the master or negative.

When a printer utilizes a mask kit as set forth above a single piece of camera-ready copy can be mounted to the mounting member and held in place to the plate by the post-opening arrangement. Other portions of the plate can be covered by the mask members, again using the post-opening arrangement. Additional exposures can be obtained by simply interchanging the mounting member, with the work still mounted to it, sequentially with each of the mask members. The time and effort for carrying out a reproduction process wherein a number of like images are provided on a master or negative and then reproduced onto the sheets of material used for printing is thereby significantly reduced. Furthermore, the post-opening arrangement provides extremely accurate positioning. In accordance with a preferred embodiment of the present invention the mounting member includes non-reproducing lines on it whereby the photoready copy can be very quickly and accurately mounted thereon.

BRIEF DESCRIPTION OF THE DRAWINGS

The invention will be better understood by reference to the figures of the drawings wherein like numbers denote like parts throughout and wherein:

FIG. 1 illustrates, in plan view, a photomasking kit in accordance with an embodiment of the present invention;

FIG. 2 illustrates, in side section, a portion of the embodiment of FIG. 1;

FIG. 3 illustrates, in side partially schematic view, an apparatus in accordance with an embodiment of the present invention;

BEST MODE FOR CARRYING OUT THE INVENTION

Figure 4:
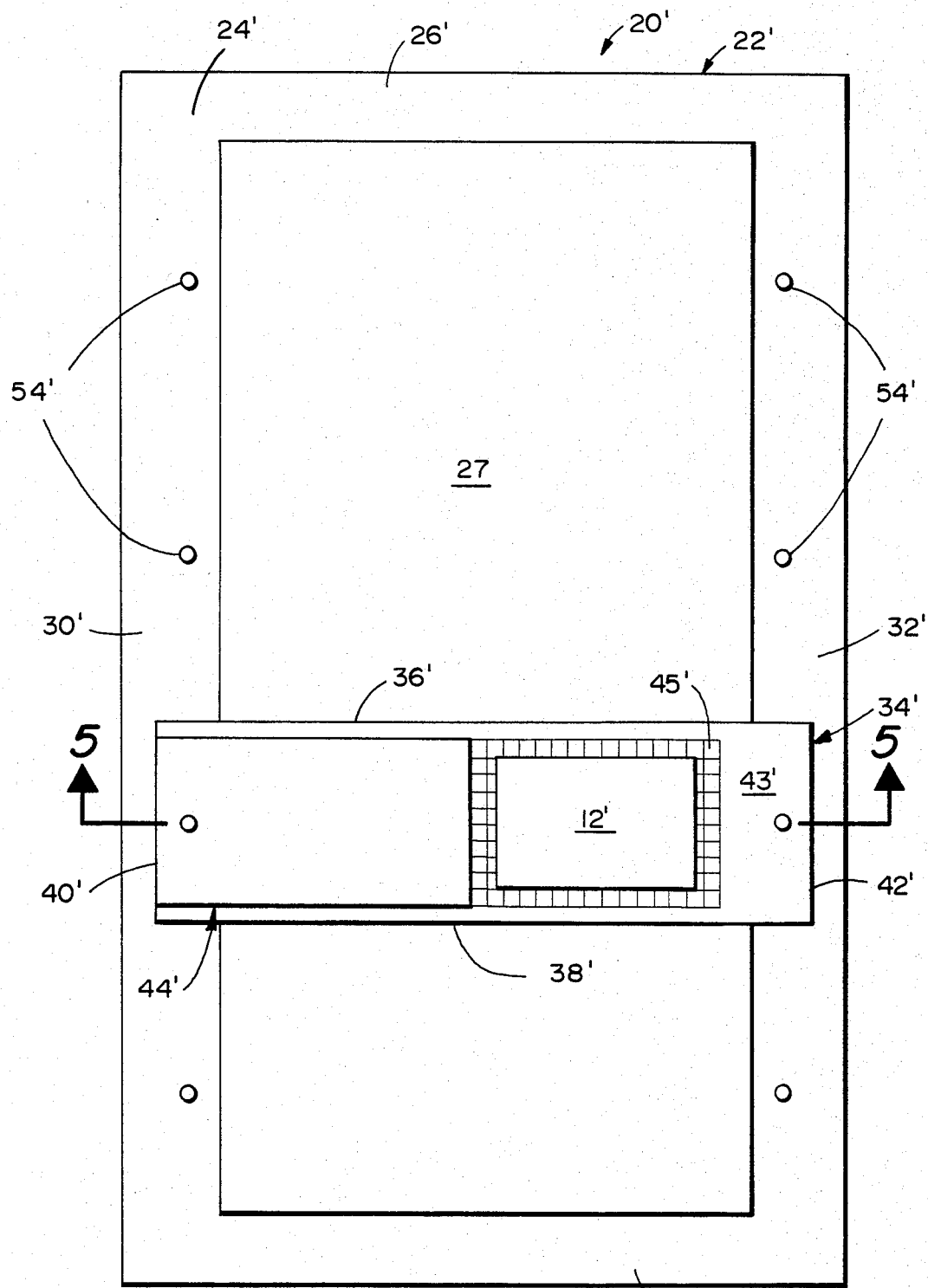
FIG. 4 illustrates, in a view similar to FIG. 1, a photomasking kit in accordance with an alternate embodiment of the present invention.

While the invention will be described in terms of photo-direct operation, wherein a positive master serves as a printing plate, it should be recognized that the invention also encompasses the production of a negative master which is used to prepare a similar printing plate.

An apparatus 10 in accordance with the present invention is illustrated in FIG. 3 for exposing a positive work 12 which is to be reproduced into a plurality of copies in such a manner as to provide a plurality of like images of the work 12 on a single master 14. The apparatus 10 includes a camera system 16 having a lens system 18. The master 14 is positioned to receive an image focused through the lens system 18.

In accordance with the present invention a photomasking kit 20 (FIGS. 1 and 2) is provided which is useful for exposing the positive work 12, which would normally be camera-ready copy, and which is to be reproduced into a plurality of copies, so as to provide a plurality of like images of the work 12 on the single master 14. The photomasking kit 20 includes a substantially flat generally rectangular plate 22 having a normally upfacing surface 24 and having upper 26, lower 28, left 30 and right 32 margins. The upfacing surface 24 of the plate 22 is of a non-reproducing color which appears to be white upon printing of a positive reproduction onto white paper from the master 14. Generally, the upfacing surface 24 of the plate 22 will simply be white.

A substantially flat generally rectangular positive work mounting member 34 forms a part of the invention. The positive work mounting member 34 has a top 36, a bottom 38, a left side 40 and a right side 42. The positive work mounting member 34 is of a non-reproducing color which appears to be white upon printing of a positive reproduction onto white paper from the master 14. Generally, the positive work mounting member 34 will simply be white itself. The mounting member 34 includes a normally upfacing mounting surface 43 which has a grid pattern 45 thereon of a non-reproducing color, generally light blue, for easy alignment of the work 12.

At least one substantially flat generally rectangular masking member 44 forms a part of the invention. The masking member 44 has a mask bottom 46, a mask top 48, a mask left side 50 and a mask right side 52. The masking member 44 is of a color such that any light reflected from it onto the master 14 is of a wavelength such that the master 14 is not exposed thereby. The masking member 44 is preferably red in color and may more preferably be made of a deep red clear plastic material. The use of a black masking member 44 is also contemplated but such is not quite as satisfactory.

A respective one of either the plate 22 or both the mounting member 34 and the masking member 44 has a plurality of posts 54 extending towards a respective other thereof. The respective other of either the plate 22 or both the mounting member 34 and the masking member 44 has a plurality of openings 56 adapted for engagement with the posts 54. The posts 54 and the openings 56 are located adjacent, generally parallel to and inboard to respective of the left margin 30, the right margin 32, the left side 40, the right side 42, the mask left side 50 and the mask right side 52. In accordance with the preferred embodiment of the invention the posts 54 comprise a pair of pluralities, equally spaced and upraised generally vertically from the upfacing surface 24 of the plate 22, one of the pluralities being adjacent the left margin 30 and another of the pluralities being adjacent the right margin 32 of the plate 22. Thus, the posts 54 adjacent the left margin 30 form a first plurality of posts 54 while the posts 54 adjacent the right margin 32 form a second plurality of posts 54. The first plurality of posts 54 and the second plurality of posts 54 together form the aforementioned pair of pluralities of posts 54. The posts 54 are preferably integrally formed with the plate 22 as by vacuum forming techniques or the like. The openings 56 in the preferred embodiment are then correspondingly adjacent the left side 40 and the right side 42 of the mounting member 34 and adjacent the mask left side 50 and the mask right side 52 of the masking member 44. The posts 54 are generally of a non-reproducing color as previously defined.

In use, a plurality of like images of a positive work 12 can be provided on a single master 14. This is done by positioning the work 12 on a mounting member 34 having a left side 40 and a right side 42 each of which have slightly inboard thereof alignment means in the form of at least one post 54 or at least one opening 56; mounting the mounting member 34 on a plate 22 having a plurality of corresponding alignment means in the nature of either openings 56 or posts 54 in such manner that the work 12 covers only a fractional portion of the plate 22; positioning at least one masking member 44 which has identical aligning means to those on the mounting member 34 on portions of the plate 22 which are not covered by the work 12 with the aligning means of the masking member 44 engaged with the aligning means of the plate 22; exposing a master or negative 14 which is focused to receive images from all portions of the plate 22 of light reflected from the plate 22; moving the mounting member 34 to another position on the plate 22 whereby the work 12 is positioned for exposure on a different portion of the single master 14; positioning at least one masking member 44 on those portions of the plates 22 which are then no longer covered by the work 12; once again exposing the master 14; and repeating the above procedure until the work 12 has been exposed to the positions on the master or negative 14 to thereby provide a plurality of like images of the work 12 on the master 14. To aid in the above procedure a plano glass sheet is normally placed over the plate 22, the mounting member 34 and the masking member 44 prior to exposing the master 14.

The kit 20 may include a plurality of different size plates 22, mounting members 34 and masking members 44 to provide multiexposed negatives or masters 14 from different sized photoready copy 12.

Figure 5:
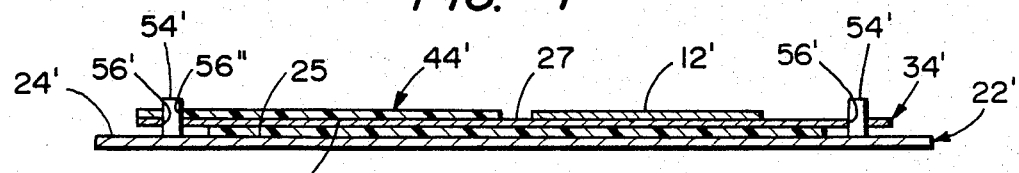
FIG. 5 illustrates, in side section view taken along line 5—5 of FIG. 4, the embodiment of FIG. 4.

Adverting to FIGS. 4 and 5, an alternate photomasking kit 20' is illustrated. Like the photomasking kit 20 of FIGS. 1-3, the photomasking kit 20' of FIGS. 4 and 5 serves for exposing a positive work 12' which is to be reproduced into a plurality of copies so as to provide a plurality of like images of the work 12' on a single master or negative 14.

A substantially flat generally rectangular plate 22' is provided having a normally upfacing surface 24'. The surface 24' has a central portion 25 of a color such that any light reflected therefrom onto the master or negative 14 is of a wavelength such that the master or negative 14 is not exposed thereby. In the particular embodiment illustrated in FIGS. 4 and 5 this is accomplished by attaching a masking structure 27 atop the plate 22' with the masking structure 27 being of a color such that any light reflected therefrom onto the master or negative 14 is of a wavelength such that the master or negative 14 is not exposed thereby. Generally, the plate 22' would be entirely of a non-reproducing color which appears to be white upon printing of a positive reproduction onto white paper from the master or negative 14. Thus, only that area covered by the masking structure 27, due to the color of the masking structure 27, would be of a color such that any light reflected onto the master or negative 14 would not expose the master or negative.

The rectangular plate 22' has respective upper 26', lower 28', left 30' and right 32' margins. The margins are of a non-reproducing color which appears to be white upon printing of a positive reproduction onto white paper from the master or negative 14.

In accordance with the present invention a substantially flat generally rectangular positive work mounting member 34' is provided having a top 36', a bottom 38', a left side 40', and a right side 42'. The positive work mounting member 34' is of a non-reproducing color which appears to be white upon printing of a positive reproduction onto white paper from the master or negative 14.

A respective one 22' or 34' of the plates 22' and the mounting member 34' has a plurality of posts 54' extending towards a respective other 34' or 22' thereof. The respective other 34' or 22' of the plate 22' and the mounting member 34' has a plurality of openings 56' adapted for engagements with the posts 54'. The posts 54' and the openings 56' are located in respective of said left margin 30 and said right margin 32 adjacent said central portion 25 and generally parallel to inboard of said left side 40' and said right side 42'. The posts 54' are a non-reproducing color which appears to be white upon printing of a positive reproduction onto white paper from the master or negative 14.

In the particular embodiment illustrated the posts 54' comprise a pair of pluralities upraised generally vertically from the upfacing surface 24', one of the pluralities being in the left margin 30 adjacent the central portion 25 and other of the pluralities being in the right margin 32 adjacent the central portion 25. The openings 56' are adjacent the left side 40' and the right side 42' of the mounting member 34 in such an instance.

As in the embodiment of FIGS. 1 and 2, the mounting member 34' generally includes a normally upfacing mounting surface 43' which has a grid pattern 45' thereon of a non-reproducing color. Also as with the embodiment of FIGS. 1 and 2, the central portion 25 of the photomasking kit 20' is preferably red as by making the masking structure 27 red, and more preferably of a clear red plastic structure.

In the embodiment illustrated in FIGS. 4 and 5 it is desirable in certain instances to also provide a substantially flat generally rectangular masking member 44'. The masking member 44' is of a size sufficient to cover slightly under one half of the work mounting member 34' and is of a color such that any light reflected therefrom onto the master or negative 14 is of a wavelength such that the master or negative 14 is not exposed thereby. The masking member 44' will generally have an opening 56" which will fit over any one of the posts 54'. In this manner, the masking member 44' can be properly positioned as shown in FIGS. 4 and 5.

When the structure as just described is utilized it is possible to expose a master or negative 14 to produce the image of the positive work 12' so as to produce twice as many images as if the positive work 12' were positioned centrally of the positive work mounting member 34'. In the embodiment illustrated in FIG. 4, it is possible to provide eight exposures of the positive work 12' on the single master or negative 14. This is done by making four exposures with the positive work 12' on the right hand side of the work mounting member 34' and then four more exposures with the positive work 12' on the left hand side of the work mounting member 34'.

INDUSTRIAL APPLICABILITY

The present invention finds particular use for aligning photoready copy for printing into a multiplicity of images. A single piece of photoready copy can be accurately and quickly exposed so as to provide like images of that single piece of photoready copy at a number of positions on a master 14. Thereafter, the master 14 is used as a positive image or plate from which a multiplicity of copies of the photoready copy are reproduced. Thereafter, the printed material can be cut into its individual portions, each of which has a complete reproduction of the photoready copy.

While the invention has been described in connection with certain specific embodiments thereof, it should be recognized that the invention is not so limited to the specific embodiments described and includes such variations and alterations thereof as may be apparent to one of skill in the art to which the invention pertains and as fall within the limits of the appended claims.

What is claimed is:

1. A photomasking kit (20) useful for exposing a positive work (12) which is to be reproduced into a plurality of copies so as to provide a plurality of like images of the work (12) on a single master or negative (14) comprising:

a substantially flat generally rectangular plate (22) having a normally upfacing surface (24), upper (26), lower (28), left (30) and right (32) margins (26, 28, 30, 32), said upfacing surface (24) being of a non-reproducing color which appears to be white upon printing of a positive reproduction onto white paper from said master or negative (14);

a substantially flat generally rectangular positive work mounting member (34) having a top (36), a bottom (38), a left side (40) and a right side (42), said positive work mounting member (34) being of a non-reproducing color which appears to be white upon printing of a positive reproduction onto white paper from said master or negative (14);

at least one substantially flat generally rectangular masking member (44) having a mask bottom (46), a mask top (48), a mask left side (50) and a mask right side (52) and being of a color such that any light reflected therefrom onto said master or negative (14) is of a wavelength such that said master or negative (14) is not exposed thereby; and a respective one (22, or 34, 44) of either said plate (22) or both said mounting member (34) and said masking member (44) having a plurality of posts (54) extending towards a respective other (34, 44 or 22) thereof and said respective other (34, 44 or 22) of either said plate (22) or both said mounting member (34) and said masking member (44) having a plurality of openings (56) adapted for engagement with said posts (54), said posts (54) and said openings (56) being located adjacent, generally parallel to, and inboard of respective of said left margin (30), said right margin (32), said left side (40), said right side (42), said mask left side (50) and said mask right side (52).

2. A photomasking kit (20) as set forth in claim 1, wherein said posts (54) comprise a pair of pluralities upraised generally vertically from said upfacing surface (24), one of said pluralities being adjacent said left margin (30) and another of said pluralities being adjacent said right margin (32); and wherein said openings (56) are adjacent said left side (40) and said right side (42) of said mounting member (34) and adjacent said mask left side (50) and said mask right side (52) of said masking member (44).

3. A photomasking kit (20) as set forth in claim 1, wherein said mounting member (34) includes a normally upfacing mounting surface (43) which has a grid pattern (45) thereon of a non-reproducing color.

4. A photomasking kit (20) as set forth in claim 1, wherein said masking member (44) is red.

5. A photomasking kit (20) useful for exposing a positive work (12) which is to be reproduced into a plurality of copies so as to provide a plurality of like images of said work (12) on a single master or negative (14) comprising:

a substantially flat generally rectangular plate (22) having a normally upfacing surface (24), upper (26), lower (28), left (30) and right (32) margins (26, 28, 30, 32), said upfacing surface (24) being of a non-reproducing color which appears to be white upon printing of a positive reproduction onto white paper from said master or negative (14);

a pair of pluralities of stationary registration posts (54) upraised generally vertically from said upfacing surface (24), one of said pluralities being generally parallel to and inboard of said left margin (30) and another of said pluralities being generally parallel to and inboard of said right margin (32), said posts (54) in said one of said pluralities being in opposite one-to-one relation with said posts (54) in said another of said pluralities;

a substantially flat generally rectangular positive work mounting member (34) having a top (36), a bottom (38), a left side (40) and a right side (42) and having mounting member openings (56) positioned for engagement with corresponding opposite of said posts (54), said positive work mounting member (34) being of a non-reproducing color which appears to be white upon printing of a positive reproduction onto white paper from said master or negative (14); and at least one substantially flat generally rectangular masking member (44) having a mask bottom (46), a mask top (48), a mask left side (50) and a mask right side (52) having substantially identical and identically located masking member openings (56) to said mounting member openings (56), said masking member (44) being of a color such that any light reflected therefrom onto said master or negative (14) is of a wavelength such that said master or negative (14) is not exposed thereby.

6. An apparatus (10) for exposing a positive work (12) which is to be reproduced into a plurality of copies so as to provide a plurality of like images of said work (12) on a single master or negative (14) comprising:

a camera (16) having a lens system (18);

a master or negative (14) positioned to receive an image focused through said lens system (18);

a substantially flat generally rectangular plate (22) having a normally upfacing surface (24), upper (26), lower (28), left (30) and right (32) margins (26, 28, 30, 32), said upfacing surface (24) being of a non-reproducing color which appears to be white upon printing of a positive reproduction onto white paper from said master or negative (14);

a substantially flat generally rectangular positive work mounting member (34) having a top (36), a bottom (38), a left side (40) and a right side (42), said positive work mounting member (34) being of a non-reproducing color which appears to be white upon printing of a positive reproduction onto white paper from said master or negative (14);

at least one substantially flat generally rectangular masking member (44) having a mask bottom (46), a mask top (48), a mask left side (50) and a mask right side (52) and being of a color such that any light reflected therefrom onto said master or negative (14) is of a wavelength such that said master or negative (14) is not exposed thereby;

a respective one (22 or 34, 44) of either said plate (22) or both said mounting member (34) and said masking member (44) having a plurality of posts (54) extending towards a respective other (34, 44 or 22) thereof and said respective other (34, 44 or 22) of either said plate (22) or both said mounting member (34) and said masking member (44) having a plurality of openings (56) adapted for engagement with said posts (54), said posts (54) and said openings (56) being located adjacent, generally parallel to, and inboard of respective of said left margin (30), said right margin (32), said left side (40), said right side (42), said mask left side (50) and said mask right side (52); and means for mounting said camera (16) to focus upon said plate (22).

7. An apparatus (10) as set forth in claim 6, wherein said posts (54) comprise a pair of pluralities upraised generally vertically from said upfacing surface (24) of said plate (22), one of said pluralities being adjacent said left margin (30) and another of said pluralities being adjacent said right margin (32); and wherein said openings (56) are adjacent said left side (40) and said right side (42) of said mounting member (34) and adjacent said mask left side (50) and said mask right side (52) of said masking member (44).

8. A method of producing a plurality of images of a positive work on a single photosensitive master or negative, comprising:

positioning said work on a mounting member of a non-reproducing color which appears to be white upon printing of a positive reproduction onto white paper from said master or negative and having a plurality of a respective one of posts or matching openings along left and right sides thereof;

mounting the mounting member on a plate having a plurality of respective others of said posts or openings along left and right margins thereof;

masking those portions of said plate which are not covered by said work with at least one masking member of a color such that any light reflected therefrom onto said master or negative is of a wavelength such that said master or negative is not exposed thereby;

exposing said master or negative focused on said plate to produce an image of said work at a position thereon;

shifting said mounting member to another position on said plate with said posts and openings engaged;

masking those portions of said plate not covered by said work with at least one masking member of a color such that any light reflected therefrom onto said master or negative is of a wavelength such that said master or negative is not exposed thereby;

re-exposing said plate to said master or negative to produce an image of said work at another position on said master or negative; and repeating said shifting and reproducing steps a sufficient number of times to produce a desired number of like images of said work upon said master or negative.

9. A photomasking kit (20') useful for exposing a positive work (12') which is to be reproduced into a plurality of copies so as to provide a plurality of like images of the work (12') on a single master or negative (14), comprising:

a substantially flat generally rectangular plate (22') having a normally upfacing surface (24') having a central portion (25) of a color such that any light reflected therefrom onto said master or negative (14) is of a wavelength such that master or negative (14) is not exposed thereby, upper (26'), lower (28'), left (30') and right (32') margins (26',28',30',32') of a non-reproducing color which appears to be white upon printing of a positive reproduction onto white paper from said master or negative (14);

a substantially flat generally rectangular positive work mounting member (34') having a top (36'), a bottom (38'), a left side (40') and a right side (42'), said positive work mounting member (34') being of a non-reproducing color which appears to be white upon printing of a positive reproduction onto white paper from said master or negative (14);

a respective one (22') or (34') of said plate (22') and said mounting member (34') having a plurality of posts (54') extending towards a respective other (34') or (22') thereof and said respective other (34') or (22') of said plate (22') and said mounting member (34') having a plurality of openings (56') adapted for engagement with said posts (54'), said posts (54') and said openings (56') being located in respective of said left margin (30') and said right margin (32') adjacent said central portion (25) and generally parallel to and inboard of said left side (40') and said right side (42'), said posts (54') being of a non-reproducing color which appears to be white upon printing of a positive reproduction onto white paper from said master or negative (14).

10. A photomasking kit (20') as set forth in claim 9, wherein said posts (54') comprise a pair of pluralities upraised generally vertically from said upfacing surface (24'), one of said pluralities being in said left margin (30') adjacent said central portion (25) and another of said pluralities being in said right margin (32') adjacent said central portion (25); and wherein said openings (56') are adjacent said left side (40') and said right side (42') of said mounting member (34').

11. A photomasking kit (20') as set forth in claim 9, wherein said mounting member (34') includes a normally upfacing mounting surface (43') which has a grid pattern (45') thereon of a non-reproducing color.

12. A photomasking kit (20') as set forth in claim 9, wherein said central portion (25) is red.

13. A photomasking kit (20') as set forth in claim 9, wherein said central portion (25) includes a masking structure (27) attached atop said plate (22') and being of a color such that any light reflected therefrom onto said master or negative (14) is of a wavelength such that said master or negative (14) is not exposed thereby.

14. A photomasking kit (20') as set forth in claim 9, further including:

a masking member (44') of a color such that any light reflected therefrom onto said master or negative (14) is of a wavelength such that said master or negative (14) is not exposed thereby, said masking member (44') being of a size and shape sufficient to mask slightly less than one half of said work mounting member (34'), said masking member (44') including a respective one of a post (54') and an opening (56') for mounting to a respective other of said post (54') and opening (56') carried by said plate (22').

* * * * *